United States Patent
Popiks (10) Patent No.: US 10,894,599 B1
(45) Date of Patent: Jan. 19, 2021

(54) RETRACTABLE VTOL ROTOR SYSTEMS AND METHODS

(71) Applicant: UAV FACTORY SIA, Marupe (LV)

(72) Inventor: Konstantins Popiks, Marupe (LV)

(73) Assignee: UAV FACTORY SIA, Marupe (LV)

( * ) Notice: Subject to any disclaimer, the term of this patent is extended or adjusted under 35 U.S.C. 154(b) by 0 days.

(21) Appl. No.: 16/800,904

(22) Filed: Feb. 25, 2020

(51) Int. Cl.
| | |
|---|---|
| B64C 29/00 | (2006.01) |
| B64C 11/00 | (2006.01) |
| B64C 13/02 | (2006.01) |
| B64C 27/02 | (2006.01) |
| B64C 27/30 | (2006.01) |

(52) U.S. Cl.
CPC .......... B64C 29/0025 (2013.01); B64C 11/00 (2013.01); B64C 13/02 (2013.01); B64C 27/022 (2013.01); B64C 27/028 (2013.01); B64C 27/30 (2013.01)

(58) Field of Classification Search
CPC ..... B64C 29/0025; B64C 27/50; B64C 27/30; B64C 39/04; B64C 1/1438
See application file for complete search history.

(56) References Cited

U.S. PATENT DOCUMENTS

| | | | | |
|---|---|---|---|---|
| 3,612,444 | A * | 10/1971 | Girard | B64C 27/30 244/7 A |
| 6,622,962 | B1 * | 9/2003 | White | B64C 27/26 244/12.3 |
| 7,159,817 | B2 * | 1/2007 | VanderMey | B64C 29/0016 244/12.1 |
| 10,029,785 | B2 * | 7/2018 | Niedzballa | B64C 29/0025 |
| 10,183,744 | B2 * | 1/2019 | Gamble | B64C 29/0091 |
| 10,336,443 | B2 * | 7/2019 | Louis | B64C 11/28 |
| 10,450,062 | B1 * | 10/2019 | Bova | B64C 5/06 |
| 2019/0337613 | A1 * | 11/2019 | Villa | B64C 39/04 |
| 2020/0031478 | A1 * | 1/2020 | Clark | B64C 29/0016 |

* cited by examiner

Primary Examiner — Richard R. Green
Assistant Examiner — Steven J Shur
(74) Attorney, Agent, or Firm — Sheppard, Mullin, Richter & Hampton LLP (57) ABSTRACT

A hybrid multi-rotor aircraft, includes a plurality of vertical propulsion rotors and at least one forward propulsion rotor. The aircraft also includes a rotor compartment within for each of the vertical propulsion rotors such that a vertical propulsion rotor may be stowed within its respective rotor compartment. A deployable rotor-compartment cover for each rotor compartment is provided and may be moved to an open state to allow the vertical propulsion rotors to be deployed and moved to a closed state to cover their respective vertical propulsion rotors when the vertical propulsion rotors or in a closed state.

16 Claims, 5 Drawing Sheets

FIG. 10

RETRACTABLE VTOL ROTOR SYSTEMS AND METHODS

TECHNICAL FIELD

The disclosed technology relates generally to VTOL aircraft, and some embodiments relate to stowable rotors for VTOL aircraft.

DESCRIPTION OF THE RELATED ART

Unmanned aerial vehicles (UAVs) generally fall into two main categories: fixed-wing and rotary aircraft, each with their own respective advantages and disadvantages. Fixed-wing aircraft can generally achieve greater endurance and range than its rotary-wing counterparts due to its aerodynamic configuration and increased efficiency. This is because the thrust force provided by the propeller is used substantially in its entirety for forward motion and the lift force provided by the fixed wings is used to generate lift. However, fixed wing aircraft generally require a sufficient runway distance for takeoff and landing.

Rotary-wing aircraft, on the other hand, can perform hovering flight and do not require a runway for takeoff. Rotary wing aircraft can typically provide vertical takeoff and landing and are generally more maneuverable and positionable and then their fixed-wing counterparts. However, because the rotors are required for vertical as well as horizontal motion, they are not as efficient at providing forward displacement motion.

Hybrid UAVs combine the features of both fixed-wing and rotary wing aircraft in an attempt to gain advantages of both systems. Multi-rotor, fixed-wing hybrid UAVs use rotors as part of a vertical propulsion system to provide takeoff and landing as well as other displacement motion in the vertical direction. Hybrid UAVs also include fixed wings to provide lift during forward motion. A forward propulsion system can be provided separate from the vertical propulsion system to provide forward displacement motion. Hybrid UAVs have gained popularity in recent years, because they can combine the flying qualities of a quadrotor (or other multi-rotor) UAV and those of fixed-wing UAVs resulting in desirable flight characteristics. With hybrid UAVs, the vertical take-off and landing capability of a rotary wing UAV and the long range and speed of fixed-wing UAVs have a be combined, while reducing or eliminating the disadvantages of both UAV types.

A popular configuration for hybrid UAVs is a hybrid quadrotor UAV that includes four vertical propulsion units (hence the term quadrotor) and one or more forward or forward propulsion units for cruise flight mode, along with a fixed-wing configuration for lift during cruising. These are sometimes referred to as a dual-system UAV, because they combine on system for hover/VTOL and in other propulsion system for cruise flight mode. These UAVs typically transition from hover/VTOL mode to forward propulsion mode and back by deactivating one of the thrust systems in accordance with the desired flight mode. Hybrid UAVs are not limited to quadrotor configurations, and may include different quantities of vertical propulsions units.

BRIEF SUMMARY OF EMBODIMENTS

According to various embodiments of the disclosed technology devices and methods for providing stowable vertical propulsion rotors on a hybrid aircraft, such as a hybrid UAV. In various embodiments, rotors of the vertical propulsion units may be deployed for hovering/VTOL operations and may be retracted and stowed within a closed compartment for cruise flight operations.

Movable covers may be provided that can be moved to an open position to allow deployment of the vertical propulsion rotors and moved to a closed position to allow the vertical propulsion rotors to be stowed when not in use. In the closed position, the covers can be configured to form a smooth surface with the rest of the aircraft to provide more streamlined or aerodynamic flight operations. Embodiments may be implemented to provide increased performance such as, for example, in the areas of increased speed, endurance, range and stability.

According to an embodiment of the disclosed technology a hybrid multi-rotor aircraft may include: a plurality of vertical propulsion rotors; a forward propulsion rotor; and a rotor compartment for each of the vertical propulsion rotors within a body portion of the hybrid multi-rotor aircraft, each rotor compartment configured to stow its respective vertical propulsion rotor; a deployable rotor-compartment cover for each rotor compartment, the deployable rotor-compartment covers configured to be moved to an open state to allow the vertical propulsion rotors to be deployed for vertical flight modes and to be moved to a closed state to cover their respective vertical propulsion rotors for forward flight operations. The hybrid multi-rotor aircraft may include any quantity of vertical propulsion rotors, such as 2, 3, 4, 5, 6, 7, 8, or more vertical propulsion rotors.

In various implementations the aircraft may be a twin-boom aircraft and each boom may include a forward and an aft vertical propulsion unit, each vertical propulsion unit may include a motor within the boom and one of the plurality of vertical propulsion rotors coupled to the motor, and wherein the rotor compartments are within a portion of the boom.

In some implementations, when in the closed state the deployable rotor-compartment covers form a surface consistent with the surfaces of their respective booms.

In various implementations the deployable rotor-compartment covers may include a unitary structure that may be raised to move the deployable rotor-compartment cover to an open state and lowered to move the deployable rotor-compartment cover to a closed state. The unitary structure may include one, two, three or more separate structures or components assembled to form the unitary structure.

In various implementations the deployable rotor-compartment covers each may include two panels that can be opened to expose their corresponding rotors. The two panels are configured to open in a butterfly configuration. The two panels of each cover may be configured to open by sliding along sides of a body portion of the aircraft at the corresponding rotor compartment.

In various implementations, when in the closed state a deployable rotor-compartment cover forms a surface consistent with the surface of the body portion of the aircraft corresponding to its respective rotor compartment.

The hybrid multi-rotor aircraft may also include a motor coupled to a deployable rotor-compartment cover by a linkage, wherein operation of the motor moves the linkage to open and close the deployable rotor-compartment cover. The linkage may include: an elongate rod having a proximal and a distal end, the proximal end coupled to a shaft of the motor; an actuating arm having a base portion coupled to the distal end of the elongate rod and an extension portion coupled to deployable rotor-compartment cover.

In some applications, actuating the motor to rotate the shaft in a first direction pulls the elongate rod down as the proximal end of elongate rod rotates about the shaft, thereby rotating the actuating arm about an axis pulling the base portion of the actuating arm downward and rotating the extension portion of the actuating arm downward thereby pulling the rotor-compartment cover downward into a closed position.

In some applications, actuating the motor to rotate the shaft in a second direction pushes the elongate rod upward as the proximal end of elongate rod rotates about the shaft, thereby rotating the actuating arm about an axis pushing the base portion of the actuating arm upward and rotating the extension portion of the actuating arm upward thereby pushing the rotor-compartment cover upward into an open position The hybrid multi-rotor aircraft may further include a plurality of magnets within each of the vertical propulsion rotors; a plurality of corresponding magnets in each of a plurality of stators. The plurality of magnets within each of the vertical propulsion rotors and the plurality of corresponding magnets in each of the stators may be positioned such that attraction between the plurality of magnets within each of the vertical propulsion rotors and the plurality of corresponding magnets in each of the stators orient the vertical propulsion rotors in a fore-aft orientation for stowage.

In various implementations the aircraft may be a multi-boom aircraft and each boom may include a vertical propulsion unit, each vertical propulsion unit including a motor within the boom and one of the plurality of vertical propulsion rotors coupled to the motor, and wherein the rotor compartments are within a portion of the boom.

Various embodiments may include a method for hybrid multi-rotor aircraft operation including: receiving a signal to operate the hybrid multi-rotor aircraft in a vertical flight mode; in response to the signal to operate the hybrid multi-rotor aircraft in a vertical flight mode, opening a plurality of deployable rotor-compartment covers to permit operation of a plurality of vertical propulsion rotors; causing rotation of the plurality of vertical propulsion rotors to operate the aircraft in a vertical flight mode; receiving a signal to operate the hybrid multi-rotor aircraft in a forward flight mode; and in response to the signal to operate the hybrid multi-rotor aircraft in a forward flight mode, closing the plurality of deployable rotor-compartment covers to enclose the plurality of vertical propulsion rotors within their respective rotor compartments.

The method may further include orienting the plurality of vertical propulsion rotors in a fore-aft orientation prior to closing the plurality of deployable rotor-compartment covers. Orienting the plurality of vertical propulsion rotors in a fore-aft orientation may include removing rotational power applied to the vertical propulsion rotors such that a plurality of magnets within the vertical propulsion rotors are attracted to a plurality of corresponding magnets in their respective stators to orient the vertical propulsion rotors in the fore-aft orientation.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Some of the figures included herein illustrate various embodiments of the disclosed technology from different viewing angles. Although the accompanying descriptive text may refer to such views as "top," "bottom" or "side" views, such references are merely descriptive and do not imply or require that the disclosed technology be implemented or used in a particular spatial orientation unless explicitly stated otherwise.

The figures are not exhaustive and do not limit the disclosure or the disclosed embodiments to the precise form disclosed.

DETAILED DESCRIPTION OF THE EMBODIMENTS

Embodiments of the technology disclosed herein are directed toward devices and methods for providing stowable vertical propulsion rotors on a hybrid aircraft, such as a hybrid UAV. In various embodiments, rotors of the vertical propulsion units may be deployed for hovering/VTOL operations and may be retracted and stowed within a closed compartment for cruise flight operations.

Movable covers may be provided that can be moved to an open position to allow deployment of the vertical propulsion rotors for vertical flight operations, and moved to a closed position to allow the vertical propulsion rotors to be stowed when not in use (such as during forward flight operations). In the closed position, the covers can be configured to form a smooth surface with the rest of the aircraft to provide more streamlined or aerodynamic flight operations. Embodiments may be implemented to provide increased performance such as, for example, in the areas of increased speed, range and stability.

Figure 1:
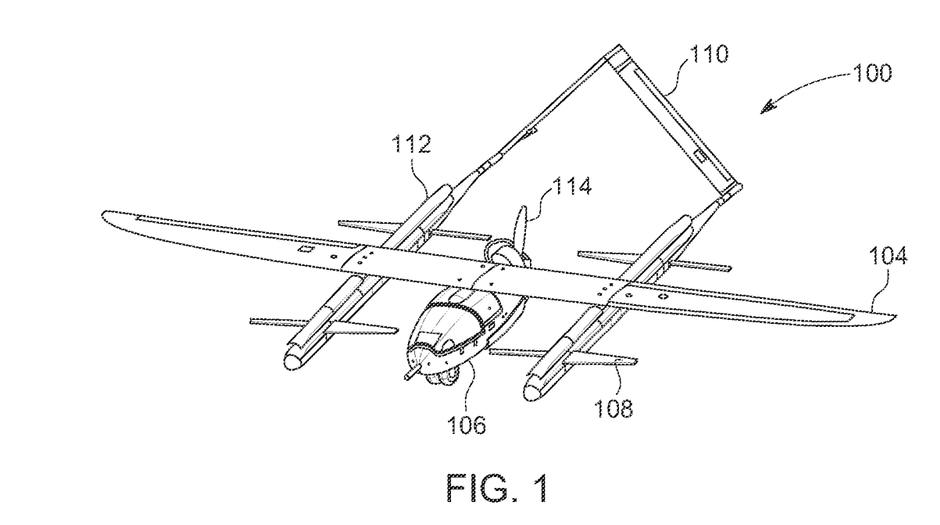
FIG. 1 illustrates an example of a twin-boom, hybrid multi-rotor UAV with which various embodiments may be implemented.

Before describing example embodiments in detail, it is useful to describe an example aircraft with which various embodiments may be implemented. FIG. 1 illustrates an example of a twin-boom, hybrid multi-rotor aircraft with which various embodiments may be implemented. This example illustrates an aircraft 100 having a fixed wing 104 extending across the top of the fuselage 106. Although fixed wing 104 in this example is illustrated as a single high-wing configuration (whether segmented or continuous), other configurations may be implemented including, for example, low-wing, mid wing, dihedral, gull wing, inverted gull wing configurations and so on.

The example aircraft illustrated in FIG. 1 is a twin-boom, quadrotor design with four rotors 108 mounted on two booms 112, two per boom in fore and aft locations. Four rotors 108 (only one is marked with a reference character to avoid unnecessary clutter in the drawing) operate in conjunction with four respective vertical propulsion units (not visible in the drawing) to provide the vertical thrust component to the aircraft. Although four vertical propulsion rotors 108 are illustrated, other quantities of vertical propulsion rotors can be utilized in various different embodiments. The technology disclosed herein can be implemented with other twin- or asymmetrical-boom configurations, twin-fuselage aircraft, or aircraft that do not include a boom.

The tail section, or empennage 110, is implemented as a boom-mounted, inverted V-tail configuration in this example. In other embodiments, other configurations can be utilized including, for example, t-tail, twin-tail triple tail, H-tail, V-tail, box, and so on.

A forward propulsion rotor 114 is provided as part of the forward propulsion system (not visible in this diagram) to supply forward propulsion thrust for the aircraft. Although a push configuration is illustrated, embodiments may also really implemented in a pull or tractor configuration as well. Also, embodiments may be implemented with more than one forward propulsion system.

To provide context for the disclosure and to provide greater ease of understanding, stowable rotor configurations according to various embodiments are described in the context of the aircraft of FIG. 1. After reading this description, one of ordinary skill in the art will appreciate how various stowable rotor configurations may be implemented in other aircraft configurations, including the various alternative configurations described above with reference to FIG. 1.

Figure 2:
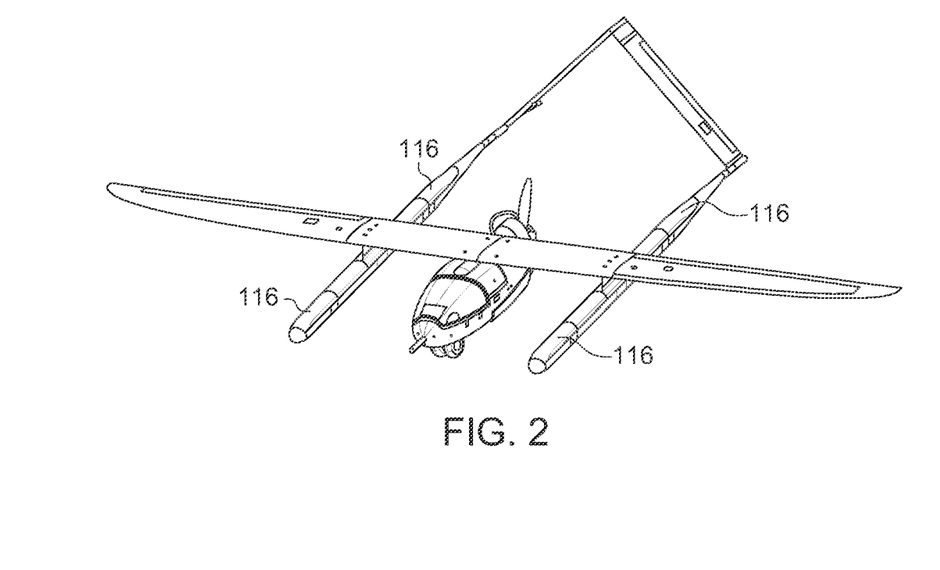
FIG. 2 illustrates the example aircraft of FIG. 1 with the vertical propulsion rotors 108 stowed in their respective storage compartments.

FIG. 2 illustrates the example aircraft of FIG. 1 with the vertical propulsion rotors 108 stowed in their respective rotor storage compartments. Deployable rotor-compartment covers 116 are used to provide an enclosure to enclose their respective stowed vertical propulsion rotors 108 such as during cruise flight mode. As described in detail below, rotor-compartment covers 116 may be opened to provide clearance for rotors 108 to rotate freely to provide hovering or vertical displacement. Various different mechanical or electromechanical mechanisms can be used to open and close (e.g. raise and lower) the compartment covers 116 to deploy and stow vertical propulsion rotors 108 in their respective rotor compartments. Various different cover configurations may be provided as well.

As illustrated in FIG. 2, with the vertical propulsion rotors 108 in a stowed position beneath closed rotor-compartment covers 116, the aircraft presents a more aerodynamic configuration than would otherwise be provided in an otherwise similar aircraft design that does not have stowable vertical propulsion rotors. When closed, rotor-compartment covers form a surface that is consistent with the surfaces of the body portion in which the rotor compartments are formed. Accordingly, in various applications, stowing the vertical propulsion rotors behind or beneath rotor-compartment covers 116 designed to allow the covered compartments to conform to the silhouette of their respective body portions of the aircraft (in this case, the booms 112) can provide enhanced flight characteristics. Such streamlined configuration may favorably reduce the drag of the aircraft, therefore increasing the endurance and range of the aircraft.

Figure 3:
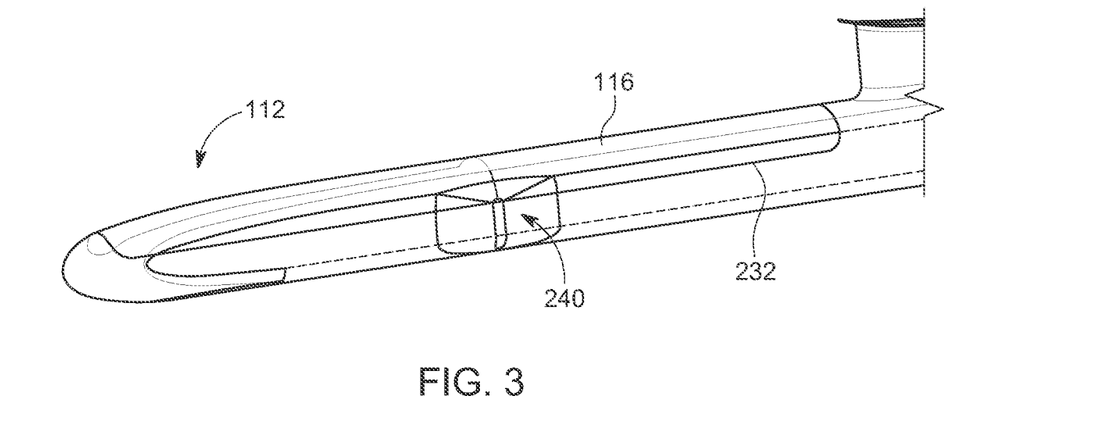
FIG. 3 provides a close-up view of a forward portion of a boom 112 with its respective rotor-compartment cover 116 in a closed position in accordance with one embodiment.

FIG. 3 provides a close-up view of a forward portion of a boom 112 with its respective rotor-compartment cover 116 in a closed position in accordance with one embodiment. As this drawing illustrates, in the closed position the contour of rotor-compartment cover 116 substantially matches the otherwise aerodynamically desirable contour of its corresponding section of boom 112. Seam line 232 shows the outer edges of rotor-compartment cover 116. This example also illustrates an expansion region 240 on the side of boom 112 and cover 116 that is provided to accommodate the width (e.g. diameter) of the motor housed in this section of the boom. Expansion region 240 can be provided in a shape and dimension to accommodate the motor or other forward propulsion unit for the respective rotor in this section of boom 112. In other embodiments, an expansion region 240 may not be required such as where the forward propulsion unit can be accommodated within the boom 112 without requiring an expansion region 240. Although the term motor generally refers to a propulsion unit powered by electricity, in this document, the term motor may be used to generally refer to other propulsion units powered by other fuel or energy sources including fuel-powered engines.

Figure 4:
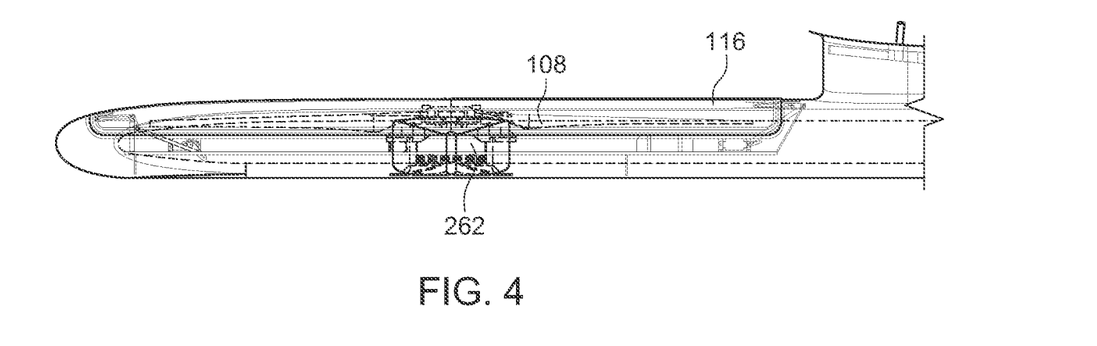
FIG. 4 illustrates a view of a rotor 108 stowed within its respective compartment beneath cover 116 in accordance with one embodiment.

FIG. 4 illustrates a view of a rotor 108 stowed within its respective compartment beneath rotor-compartment cover 116 in accordance with one embodiment. As this example illustrates, rotor one in his stowed beneath closed compartment cover 116 within its respective portion of boom 112. In addition, in the vertical propulsion unit 262 is also contain entirely within its respective portion of boom 112 along with its respective rotor one. In this example, vertical propulsion unit 262 may include an electric motor powered by a battery or other electrical energy source to operate rotor 108. In other embodiments, vertical propulsion unit 262 may include other mechanisms for providing rotational force to rotor one including, for example, a gasoline or diesel powered engine, a hydrogen powered fuel cell and so on.

In the example of FIG. 4, rotor 108 is a twin-blade rotor and it is stowed with its blade locked in a fore-aft orientation to fit within its respective compartment beneath its respective rotor-compartment cover 116. Although any of a number of different mechanisms may be utilized to orient rotor 108 into this fore-aft orientation, example embodiments using magnetic rotor orientation are described below.

Figure 5:
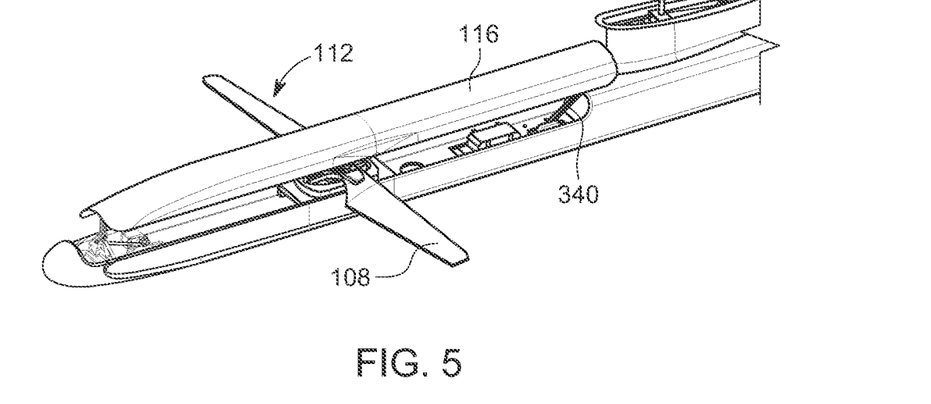
FIG. 5 illustrates a close-up view of a forward portion of a boom 112 with its respective rotor-compartment cover 116 in an open position in accordance with one embodiment.

FIG. 5 illustrates a close-up view of a forward portion of a boom 112 with its respective rotor-compartment cover 116 in an open position in accordance with one embodiment. In this example, rotor 108 is shown as extending outward from beneath cover 116 through the opening provided between cover 116 and the respective portion of boom 112. With rotor-compartment cover 116 in this open position, rotor 108 is free to rotate to provide vertical thrust for the aircraft.

Figure 6:
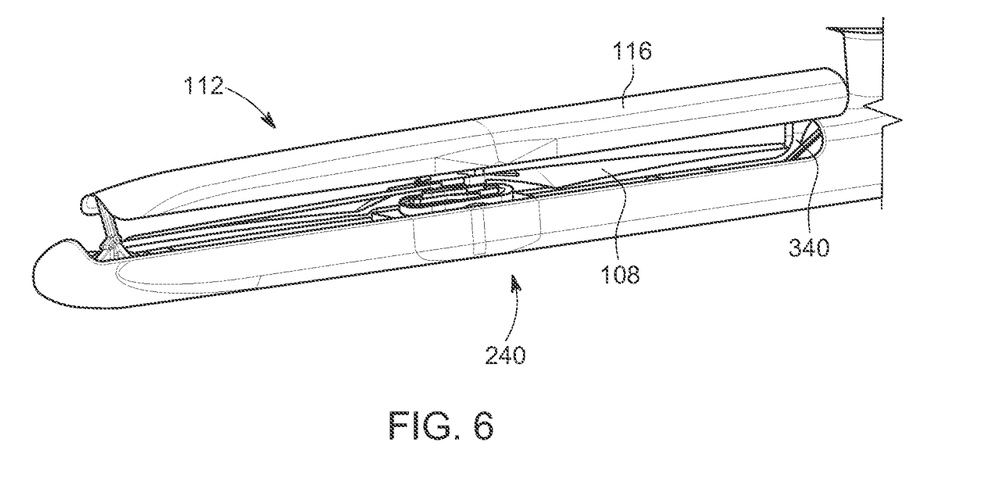
FIG. 6 illustrates a close-up view of a forward portion of a boom 112 with its respective rotor compartment cover 116 in an open position in accordance with one embodiment.

FIG. 6 illustrates a close-up view of a forward portion of a boom 112 with its respective rotor compartment cover 116 in an open position in accordance with one embodiment. This example is similar to the example of FIG. 5, but shows rotor 108 in a fixed fore-aft orientation such that cover 116 may be closed. This illustrates an example of how rotor 108 can be oriented such that can fit within the rotor compartment created by the opening in boom 112 and rotor compartment cover 116. As noted previously, expansion region 240 may be omitted where not necessary to accommodate the vertical propulsion unit.

Figure 7:
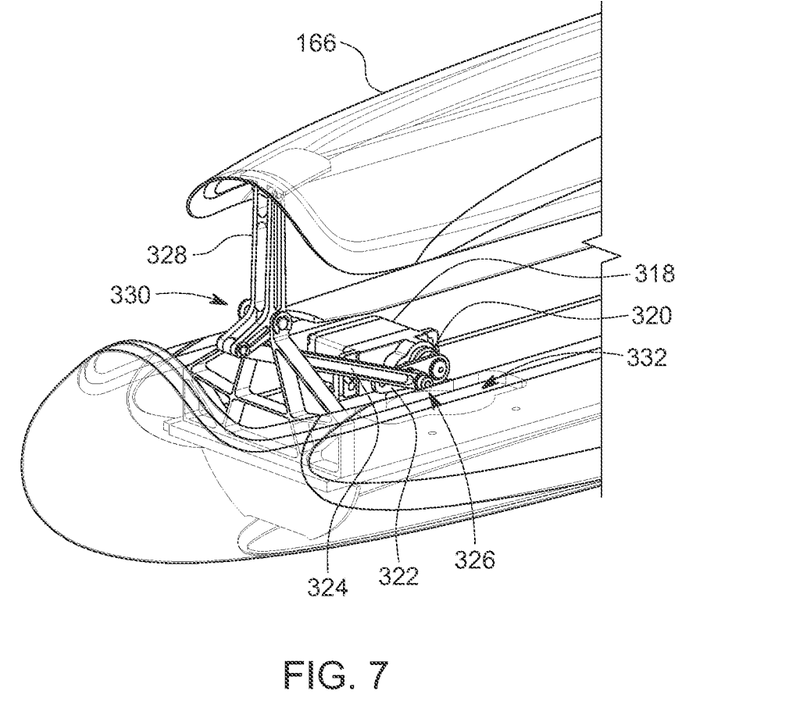
FIG. 7 illustrates a mechanism for raising and lowering cover 116 in accordance with one embodiment.

FIG. 7 illustrates a mechanism for raising and lowering cover 116 in accordance with one embodiment. This example includes a motor 318 with a linkage coupled between the motor 318 and its respective cover 116. In this example, motor 318 is used to rotate a shaft 320 to which an arm 322 is mounted. Motor 318 may be implemented, for example, as a DC stepper or servo motor. Also in this example, an elongate rod 324 is coupled between a stud 326 mounted on arm 322 on one end, and an actuating arm 328 on the other end. In the open position, arm 322 is disposed in a forward orientation with lever rod 324 extending forward and upward and actuating arm 328 extending substantially vertically holding rotor-compartment cover 116 in the open position. In this example, actuating arm 328 is roughly "L" shaped having a longer extension portion (extending upward in this orientation) and a shorter base portion (extending forward in this orientation) and rotatable about an axis 330.

Actuating motor 318 to rotate shaft 320 in a counterclockwise direction moves arm 322 counterclockwise through opening 332. This pulls the elongate lever rod 324 rearward and down as the proximal end of elongate lever rod 324 also moves counterclockwise about shaft 320. This has the effect of rotating actuating arm 328 counterclockwise about axis 330, pulling base portion of actuating arm 328 downward and rearward and rotating extension portion of actuating arm 328 forward and downward. This pulls rotor-compartment cover 116 forward and downward into the closed position.

From the closed position, reversing actuating motor 318 rotate shaft 320 in a clockwise direction, moving arm 322 clockwise through opening 332. This pushes elongate lever rod 324 forward and upward as the proximal end of elongate lever rod 324 also moves clockwise about shaft 320. This pushes the base portion of actuating arm 328 forward and upward, rotating actuating arm 328 clockwise about axis 330, pushing the distal end of the extension portion of actuating arm 328 upward and to the rear. This pushes rotor-compartment cover 116 upward and rearward into the open position to create an opening between rotor-compartment cover 116 and boom 112 so that rotor 108 can rotate freely in this created opening.

In this example, a single motor 318 can be used to actuate the cover so that rotor-compartment cover 116 can be moved between the open and closed positions. As can be seen in FIGS. 5 and 6, a rear support arm 340 at the aft end of rotor-compartment cover 116 provides support to the aft end of rotor-compartment cover 116 when opened and can also help control the orientation of rotor-compartment cover 116 during opening and closing operations. Although this can be a passive, nonpowered support arm, embodiments can be implemented where the aft support arm is actively controlled such as via a motor actuator. The illustrated embodiments depict fore and aft support arms for rotor-compartment cover 116. In other embodiments, other quantities of support arms can be utilized. Note that such support arms are ideally positioned such that they do not interfere with the operation of rotors 108.

A servo motor can be used to provide feedback so that a control system on the aircraft or ground control station can monitor the open/closed state of rotor-compartment cover 116. Likewise, sensors such as shaft encoders, optical sensors or other sensors can be used to provide data that can be used to determine the open/closed state of rotor-compartment cover 116.

Figure 8:
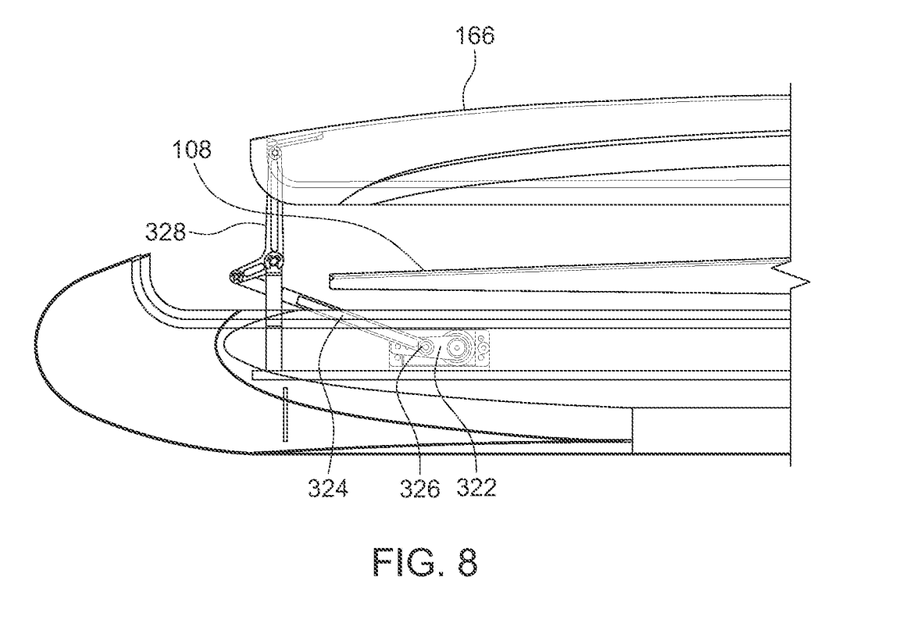
FIG. 8 illustrates a side view of a forward portion of boom 112 with rotor-compartment cover 116 in an open position in accordance with one embodiment.

FIG. 8 illustrates a side view of a forward portion of boom 112 with rotor-compartment cover 116 in an open position in accordance with one embodiment. In this example, extension portion of actuating arm 328 is in a substantially vertical position holding rotor-compartment cover 116 open and rearward of boom 112.

Figure 9:
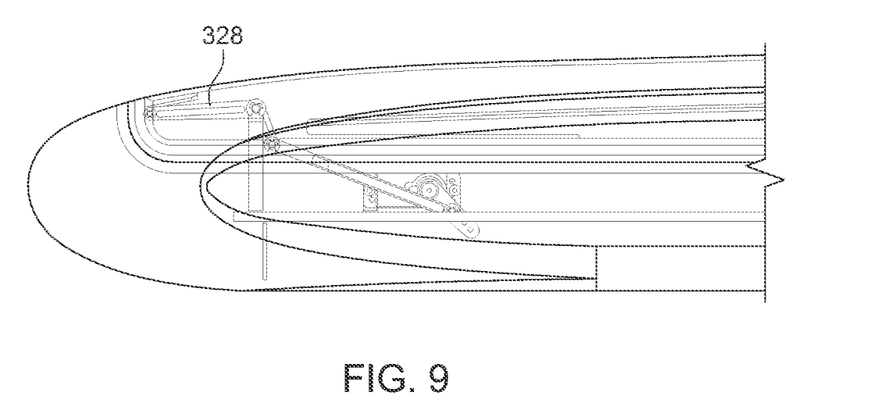
FIG. 9 illustrates a side view of the forward portion of boom 112 with rotor-compartment cover 116 in a closed position in accordance with one embodiment.

FIG. 9 illustrates a side view of the forward portion of boom 112 with rotor-compartment cover 116 in a closed position in accordance with one embodiment. In this example, extension portion of actuating arm 328 is in a substantially horizontal orientation holding rotor-compartment cover 116 closed in place covering the opening of the rotor compartment within boom 112.

In operation, a control system or circuit for the rotor-compartment covers 116 receives receiving a signal to operate the hybrid multi-rotor aircraft in a vertical flight mode. In response to the signal to operate the hybrid multi-rotor aircraft in a vertical flight mode, the control system energizes an actuator (e.g., such as that described above with reference to FIG. 7) to open a plurality of deployable rotor-compartment covers 116 to permit operation of a plurality of vertical propulsion rotors 108. The control system can also be configured to cause rotation of the plurality of vertical propulsion rotors to operate the aircraft in a vertical flight mode.

Upon receiving a signal to operate the hybrid multi-rotor aircraft in a forward flight mode and in response to this signal, the control system energizes the actuator to close the plurality of deployable rotor-compartment covers on 16 to enclose the plurality of vertical propulsion rotors within their respective rotor compartments. The rotors can be aligned in the fore-aft position prior to closing the rotor-compartment covers 116.

Figure 10:
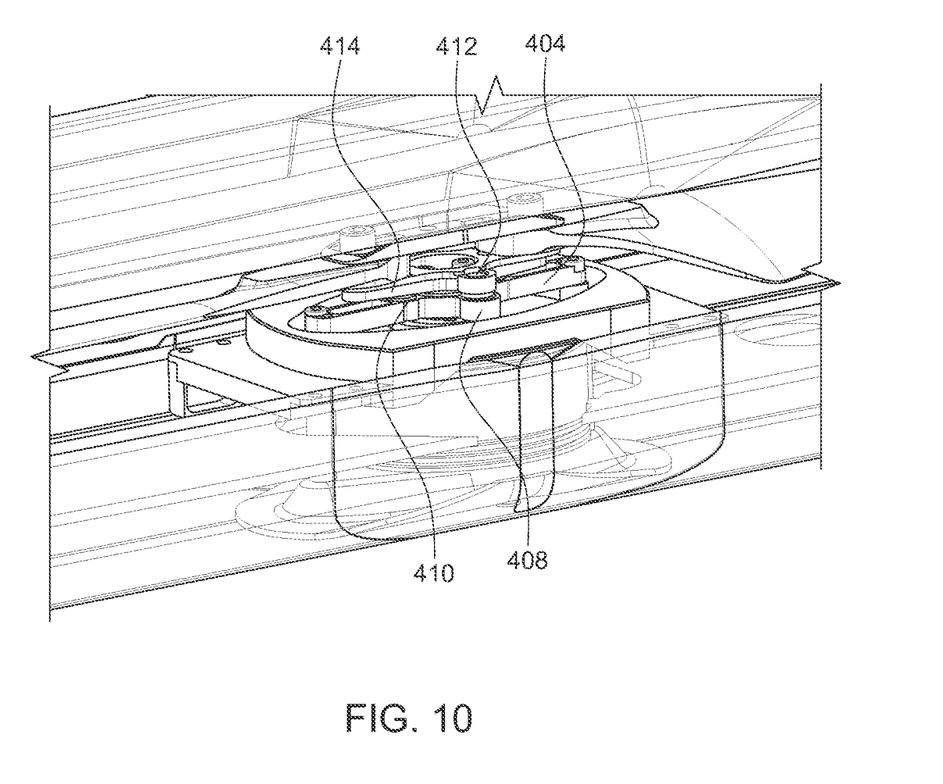
FIG. 10 illustrates a rotor alignment system that can be used to orient rotors 108 into a fore-aft position in accordance with one embodiment.

FIG. 10 illustrates a rotor alignment system that can be used to orient rotors 108 into a fore-aft position in accordance with one embodiment. This example system utilizes a plurality of magnets affixed to rotor 108 and also affixed to a support structure at its corresponding propulsion unit. In this example, magnets on mounting arm 404 can be provided as two magnet pairs in the stator. One magnet pair 408, 410 is visible in the diagram. Another magnet pair on the stator, not visible in the diagram are positioned opposite magnet pair 408, 410. Magnet pair 412, 414 on rotor 108 is visible in the diagram. Another magnet pair on the rotor, not visible in the diagram are positioned opposite magnet pair 412, 414.

Focusing on the visible magnet pairs 408, 410 and 412, 414, magnet 408 has the opposite polarity of magnet 412, and magnet 410 has the opposite polarity of magnet 414. The magnet pairs not visible have similar orientations and polarities. The magnets in the rotor are attracted to the corresponding magnets in the stator having an opposite polarity. Accordingly, rotor 108 will arrange itself in the orientation in which opposing polarity magnets 408, 412 and opposing polarity magnets 410, 414 are adjacent one another, which orients the rotor in one of two orientations—0° or 180° such that the rotor is aligned longitudinally with the boom. At rotor orientations of 90° or 270° (e.g., the rotor is oriented perpendicular to the longitudinal axis of the boom) the magnets in the rotor will be in the proximity of corresponding magnets in the stator having the same polarity. The repulsion forces of the magnets at this orientation will provide restoring forces to move the rotor toward the 0° or 180° orientation. The attractive forces of the magnets will further provide restoring forces to arrange the rotor in the stowed position.

In some embodiments, position encoders or other sensors may be included with rotor 108 to enable the rotors to be powered into a desired position to align them in a stowable fore-aft orientation. The alignment can be performed mechanically or electromechanically such as, for example, by directly controlling the position of the motor by providing a PWM signal to the motor controller and reading out the position of the rotor through a feedback device such as encoder, optical, hall or mechanical sensor.

Various embodiments can include a control system or other circuitry to control the operation of motor 318 to open and close rotor-compartment cover 116 and to orient rotor is 108 in a stowable position. In operation, during vertical takeoff and landing flight modes as well as hover modes, the control system opens rotor-compartment cover 116 and unlocks (if necessary) rotors 108 from their stowable position so that they can be rotated by their respective propulsion units (e.g., motors) for takeoff and landing operations. When the aircraft has transitioned to horizontal flight mode with sufficient lift provided by wings 104, for example, the control system can fix the rotors 108 in a fore-aft (0° or 180°) orientation, enclosing rotor-compartment covers 116 to provide a more aerodynamic aircraft profile during forward flight. In embodiments with magnetic rotor orientation control, it may not be necessary for the control system to fix the rotors in the fore-aft (0° or 180°) orientation, as the magnets can accomplish this when rotational forces of the motor are removed from the rotor. When it is time to hover or land the aircraft, the control system can reopen rotor-compartment covers 116 and initiate rotation of rotors 108. When rotors 108 are providing a sufficient or desired amount of lift for the chosen flight mode, the forward propulsion unit can, but need not, be shut down until it is needed again for forward flight operations. In some embodiments, the forward propulsion unit can remain powered on to help control the aircraft, such as to counter the effects of any wind.

Rotor-compartment covers 116 described herein are described as a unitary structure (whether or not made of multiple separate structures or components) that can be deployed in a single piece in an upward fashion. Rotor compartment covers 116 are not limited to this configuration and may be implemented in other configurations as well. For example, rotor-compartment covers 116 can be configured as butterfly doors with two opposed sections that open outward from one another and rotate below their respective rotors 108. Similarly, rotor-compartment cover 116 can be configured as two longitudinal sections that slide horizontally down and over their respective sides of their respective boom 112 in yet another example, rotor-compartment cover 116 can be configured as sliding panels on the side of booms 112 that can be slid or folded open to provide slots on either side of the boom through which rotor 108 can rotate.

The terms "substantially" and "about" used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The term "coupled" refers to direct or indirect joining, connecting, fastening, contacting or linking, and may refer to various forms of coupling such as physical, optical, electrical, fluidic, mechanical, chemical, magnetic, electromagnetic, optical, communicative or other coupling, or a combination of the foregoing. Where one form of coupling is specified, this does not imply that other forms of coupling are excluded. For example, one component physically coupled to another component may reference physical attachment of or contact between the two components (directly or indirectly), but does not exclude other forms of coupling between the components such as, for example, a communications link (e.g., an RF or optical link) also communicatively coupling the two components. Likewise, the various terms themselves are not intended to be mutually exclusive. For example, a fluidic coupling, magnetic coupling or a mechanical coupling, among others, may be a form of physical coupling.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A hybrid multi-rotor aircraft, comprising:
  a plurality of vertical propulsion rotors;
  a forward propulsion rotor; and
  a rotor compartment for each of the plurality of vertical propulsion rotors, the rotor compartments disposed within a respective body portion of the hybrid multi-rotor aircraft, each rotor compartment configured to stow its respective vertical propulsion rotor;
  a deployable rotor-compartment cover for each rotor compartment, the deployable rotor-compartment covers each configured to be moved to an open state to allow the vertical propulsion rotors to be deployed for vertical flight modes and to be moved to a closed state to cover its respective vertical propulsion rotor for forward flight operations;
  a motor coupled to at least one of the deployable rotor-compartment covers by a linkage, wherein operation of the motor moves the linkage to open and close the at least one of the deployable rotor-compartment covers; wherein the linkage comprises:
    an elongate rod having a proximal and a distal end, the proximal end coupled to a shaft of the motor;
    an actuating arm having a base portion coupled to the distal end of the elongate rod and an extension portion coupled to its respective deployable rotor-compartment cover.

2. The hybrid multi-rotor aircraft of claim 1, wherein actuating the motor to rotate the shaft in a first direction pulls the elongate rod down as the proximal end of elongate rod rotates about the shaft, thereby rotating the actuating arm about an axis pulling the base portion of the actuating arm downward and rotating the extension portion of the actuating arm downward thereby pulling its respective rotor-compartment cover downward into a closed position.

3. The hybrid multi-rotor aircraft of claim 1, wherein actuating the motor to rotate the shaft in a second direction pushes the elongate rod upward as the proximal end of elongate rod rotates about the shaft, thereby rotating the actuating arm about an axis pushing the base portion of the actuating arm upward and rotating the extension portion of the actuating arm upward thereby its respective the rotor-compartment cover upward into an open position.

4. A hybrid multi-rotor aircraft, comprising;
  a plurality of vertical propulsion rotors;
  a forward propulsion rotor; and
  a rotor compartment for each of the plurality of vertical propulsion rotors, the rotor compartments disposed within a respective body portion of the hybrid multi-rotor aircraft, each rotor compartment configured to stow its respective vertical propulsion rotor;
  a deployable rotor-compartment cover for each rotor compartment, the deployable rotor-compartment covers each comprising structure configured to be moved upward from its respective body portion and in an aft direction to an open state to allow the vertical propulsion rotors to be deployed for vertical flight modes and to be moved forward and downward toward its respective body portion to a closed state to cover its respective vertical propulsion rotor for forward flight operations;
  a linkage, wherein the linkage comprises: an elongate rod having a proximal and a distal end, the proximal end coupled to a shaft of the motor; an actuating arm having a base portion coupled to the distal end of the elongate rod and an extension portion coupled to its respective deployable rotor-compartment cover.

5. The hybrid multi-rotor aircraft of claim 4, wherein the aircraft is a twin-boom aircraft and each boom comprises a forward and an aft vertical propulsion unit, each vertical propulsion unit comprising a motor within its respective boom and one of the plurality of vertical propulsion rotors coupled to the motor, and wherein the rotor compartments are within a portion of the boom.

6. The hybrid multi-rotor aircraft of claim 5, wherein when in the closed state the deployable rotor-compartment covers form a surface consistent with the surfaces of their respective booms.

7. The hybrid multi-rotor aircraft of claim 4, wherein the deployable rotor-compartment covers comprise a unitary structure that is raised to move the deployable rotor-compartment cover to an open state and lowered to move the deployable rotor-compartment cover to a closed state.

8. The hybrid multi-rotor aircraft of claim 4, wherein when in the closed state the deployable rotor-compartment covers form a surface consistent with the surface of the body portion of the aircraft corresponding to their respective rotor compartment.

9. The hybrid multi-rotor aircraft of claim 4, further comprising a motor coupled to at least one of the deployable rotor-compartment covers by the linkage, wherein operation of the motor moves the linkage to open and close the at least one of the deployable rotor-compartment cover covers.

10. The hybrid multi-rotor aircraft of claim 4, further comprising
a plurality of magnets within each of the vertical propulsion rotors;
a plurality of corresponding magnets in each of a plurality of stators;
wherein the plurality of magnets within each of the vertical propulsion rotors and the plurality of corresponding magnets in each of the stators are positioned such that attraction between the plurality of magnets within each of the vertical propulsion rotors and the plurality of corresponding magnets in each of the stators orient the vertical propulsion rotors in a fore-aft orientation for stowage.

11. The hybrid multi-rotor aircraft of claim 4, wherein the aircraft is a multi-boom aircraft and each boom comprises a vertical propulsion unit, each vertical propulsion unit comprising a motor within the boom and one of the plurality of vertical propulsion rotors coupled to the motor, and wherein the rotor compartments are within a portion of the boom.

12. The hybrid multi-rotor aircraft of claim 4, further comprising:
a plurality of rotor magnets of a first polarity, each rotor magnet of the plurality of rotor magnets of the first polarity affixed to a respective vertical propulsion rotor of the plurality of vertical propulsion rotors in a position offset in a first direction along a rotor axis from a center of rotation of the rotors;
a plurality of rotor magnets of a second polarity, each rotor magnet of the plurality of rotor magnets of the second polarity affixed to a respective vertical propulsion rotor of the plurality of vertical propulsion rotors in a position offset in a second direction, opposite the first direction, along the rotor axis from the center of rotation of the rotors;
a plurality of stator magnets of the first polarity, each stator magnet of the plurality of stator magnets of the first polarity affixed to a respective stator bracket corresponding to a vertical propulsion rotor of the plurality of vertical propulsion rotors, in a position offset from a center of rotation of its corresponding to a vertical propulsion rotor in a first lateral direction perpendicular to a longitudinal axis of a body portion in which the respective stator bracket is housed; and
a plurality of stator magnets of the second polarity, each stator magnet of the plurality of stator magnets of the second polarity affixed to a respective stator bracket corresponding to a vertical propulsion rotor of the plurality of vertical propulsion rotors, in a position offset from a center of rotation of its corresponding to a vertical propulsion rotor in a second lateral direction opposite the first lateral direction and perpendicular to the longitudinal axis of a body portion in which the respective stator bracket is housed;
wherein the plurality of magnets within each of the vertical propulsion rotors and the plurality of corresponding magnets in each of the stators are positioned such that attraction between corresponding ones of the rotor magnets and the stator magnets orient the vertical propulsion rotors in a fore-aft orientation for stowage.

13. A method for hybrid multi-rotor aircraft operation, comprising:
receiving a signal to operate the hybrid multi-rotor aircraft in a vertical flight mode;
in response to the signal to operate the hybrid multi-rotor aircraft in a vertical flight mode, opening a plurality of deployable rotor-compartment covers to permit operation of a plurality of vertical propulsion rotors, wherein opening a plurality of deployable rotor-compartment covers, comprises moving each of the plurality of deployable rotor-compartment covers upward from its respective body portion and in an aft direction to an open position to allow the vertical propulsion rotors to be deployed for vertical flight modes;
causing rotation of the plurality of vertical propulsion rotors to operate the aircraft in a vertical flight mode;
receiving a signal to operate the hybrid multi-rotor aircraft in a forward flight mode; and
in response to the signal to operate the hybrid multi-rotor aircraft in a forward flight mode, closing the plurality of deployable rotor-compartment covers to enclose the plurality of vertical propulsion rotors within their respective rotor compartments, wherein closing the plurality of deployable rotor-compartment covers comprises moving each of the plurality of deployable rotor-compartment covers from the open position forward and downward toward its respective body portion to a closed position to cover its respective vertical propulsion rotor for forward flight operations; a linkage, wherein the linkage comprises: an elongate rod having a proximal and a distal end, the proximal end coupled to a shaft of the motor; an actuating arm having a base portion coupled to the distal end of the elongate rod and an extension portion coupled to its respective deployable rotor-compartment cover.

14. The method of claim 13, further comprising orienting the plurality of vertical propulsion rotors in a fore-aft orientation prior to closing the plurality of deployable rotor-compartment covers.

15. The method of claim 14, wherein orienting the plurality of vertical propulsion rotors in a fore-aft orientation comprises removing rotational power applied to the vertical propulsion rotors such that a plurality of magnets within the vertical propulsion rotors are attracted to a plurality of corresponding magnets in their respective stators to orient the vertical propulsion rotors in the fore-aft orientation.

16. The method of claim 15, wherein:
the plurality of magnets within the vertical propulsion rotors comprise:
a plurality of rotor magnets of a first polarity, each rotor magnet of the plurality of rotor magnets of the first polarity affixed to a respective vertical propulsion rotor of the plurality of vertical propulsion rotors in a position offset in a first direction along a rotor axis from a center of rotation of the rotors;
a plurality of rotor magnets of a second polarity, each rotor magnet of the plurality of rotor magnets of the second polarity affixed to a respective vertical propulsion rotor of the plurality of vertical propulsion rotors in a position offset in a second direction, opposite the first direction, along the rotor axis from the center of rotation of the rotors;
a plurality of stator magnets of the first polarity, each stator magnet of the plurality of stator magnets of the first polarity affixed to a respective stator bracket corresponding to a vertical propulsion rotor of the plurality of vertical propulsion rotors, in a position offset from a center of rotation of its corresponding to a vertical propulsion rotor in a first lateral direction perpendicular to a longitudinal axis of a body portion in which the respective stator bracket is housed; and a plurality of stator magnets of the second polarity, each stator magnet of the plurality of stator magnets of the second polarity affixed to a respective stator bracket corresponding to a vertical propulsion rotor of the plurality of vertical propulsion rotors, in a position offset from a center of rotation of its corresponding to a vertical propulsion rotor in a second lateral direction opposite the first lateral direction and perpendicular to the longitudinal axis of a body portion in which the respective stator bracket is housed;

wherein the plurality of magnets within each of the vertical propulsion rotors and the plurality of corresponding magnets in each of the stators are positioned such that attraction between corresponding ones of the rotor magnets and the stator magnets orient the vertical propulsion rotors in a fore-aft orientation for stowage.

\* \* \* \* \*